Nov. 28, 1933. C. CREMER ET AL 1,937,054
OIL FILLED CABLE
Filed June 13, 1931
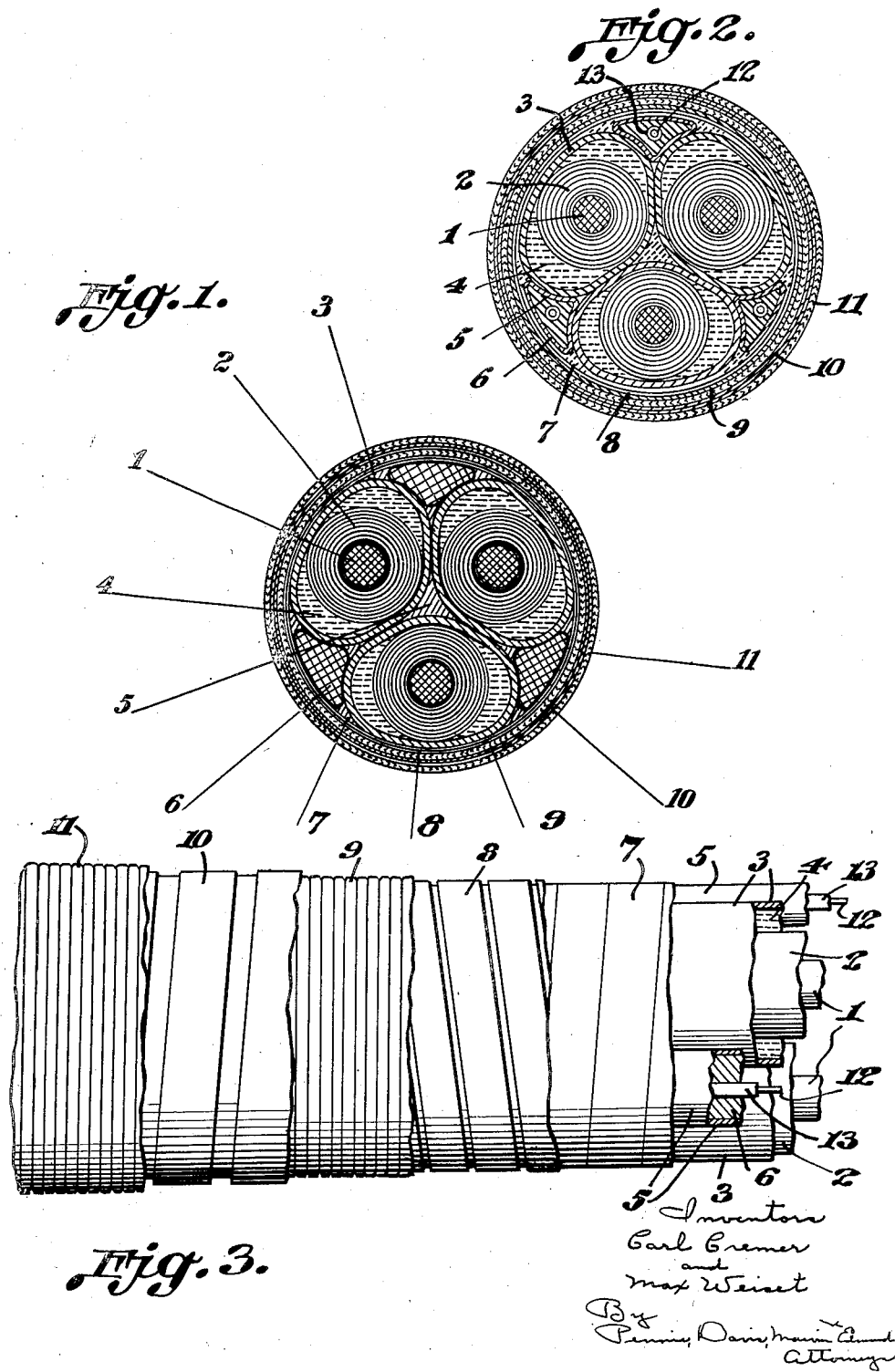

Patented Nov. 28, 1933

1,937,054

UNITED STATES PATENT OFFICE 1,937,054

OIL-FILLED CABLE

Carl Cremer, Copenick-Wendenschloss, near Berlin, and Max Weiset, Tempelhof, near Berlin, Germany Application June 13, 1931, Serial No. 544,134, and in Germany June 27, 1928

4 Claims. (Cl. 173—266)

In high tension cables with paper insulation which have been impregnated with the usual, viscid insulating materials consisting of mixtures of oil and resins there is always, as is well known, the danger, that the heating and cooling of the cable during service causes hollow spaces in the insulation. These hollow spaces are the cause of ionization processes destroying the insulation and finally resulting in punctures or breakdowns and interruptions.

For this reason it has been suggested to employ thinly liquid oils instead of the viscid impregnating masses for the impregnation, and arrangements have been made which during the heating and cooling of the cable allow the oil to flow out of or flow into the insulation layers again. Up to now cables of this kind have been produced in such a manner, that either hollow spaces were disposed within the conductor or that hollow spaces for the reception and for the passage of the oil between the lead sheaths and the insulation layers were provided. In the latter case special means were required for ensuring the necessary distance between the lead sheath and the insulation, e. g. in the shape of strands of paper, hemp or the like wound spirally round the insulation.

The object of the present invention is an oil-filled twisted multiple-core cable, in which the oil channels between the outer limitation of the insulating layers and the sheaths have been formed without the provision of special spacing means. The invention consists in so covering or spinning round the approximately round conductors with layers of paper, that the insulating layers will also be of an approximately circular cross section. The lead sheath, however, will not be of a circular cross section, but of an elliptical cross section, in such a manner, that between the surface of the conductor and the lead sheath two falciform hollow spaces are produced adapted to receive the surplus insulating oil. The production of for instance a twisted three-core cable in accordance with the present invention may be effected in such a manner, that the separate insulated conductors or cores are first enclosed each in a lead sheath of circular cross section of larger internal diameter than is corresponding to the outer diameter of the insulation. The three separate cables are then twisted with one another and in connection therewith drawn through a nipple with round bore of such a width, that the three lead sheaths are squeezed together, thus obtaining a sectorlike cross section.

In the drawing several embodiments of the invention are represented by way of example.

In the drawing,

Fig. 1 is a cross-section of a three-core cable according to the invention,

Fig. 2 is a cross-section of a modification, in which auxiliary lines are embedded into the filling material of the triangular spaces between the three cores of the cable, and Fig. 3 is a fragmentary perspective view, partly broken away, of a cable according to Fig. 2.

In the embodiment of the invention represented in Figure 1 the reference character 1 indicates the three conductors of a twisted three-core cable, 2 the insulating layers, 3 the lead sheaths. Between the insulation 2 and the lead sheaths 3 the falciform hollow spaces 4 are arranged which extend through the whole length of the cable, said hollow spaces being filled with the same insulating oil which is made use of also for impregnating the insulating layers 2. The triangular spaces 5 and 6 are filled with a material which cannot or can only to a small extent be compressed, as for instance strands of a lead-tin alloy, or with tubes of triangular shape consisting of metal or a metal alloy. In the latter case the hollow spaces of these tubes may be utilized for the reception of special electric lines f. i. signalling lines or remote or distant signalling lines.

The three lead sheaths are covered by one or a few layers 7 of firmly applied or spinned round impregnated paper, this in turn being covered by a thin metallic band or strip 8 of great tensile strength, for instance a band or a strip of phosphor bronze or steel, firmly applied or spinned around in close spires or screw threads of low pitch. By means of this expedient it will be ensured, that the whole of the cable is rendered highly resistant also against very high oil pressures in its interior. In this way a cable of great compressive strength will be obtained. The metal band or strip 8 is covered in a known manner by a layer of jute 9, an armouring 10 of for instance iron ribbon, and the outer layer of jute 11.

In view of the fact that the hollow spaces produced in the cable constructed in accordance with the present invention can be made sufficiently large in order to ensure the motion of oil and the provision of the insulation with oil even in conjunction with considerable differences in temperature, it is not necessary, to provide hollow spaces yet in the conductors proper for the reception of the oil. Solid, i. e. single-wire conductors may be employed. In the embodiment according to Figs. 2 and 3, the construction of the three cores is similar to that in the first example, and similar reference characters refer to like parts of the figures. The triangular spaces between the cores are here filled with tubes 5 of triangular cross-section, in which a weak material 6 is enclosed. In this material an electrical line 12 with insulation 13 is embedded. As Fig. 3 shows, the metal band 8 surrounding the twisted cores, is spun in close spirals of low pitch around the three cores.

Having now particularly described and ascertained the nature of our said invention, what we claim is:

1. An oil-filled multiple-core cable with separately insulated conductors of circular cross section, each of said separate insulated conductors being enclosed by a lead sheath, said sheath being of an elliptical cross-section, falciform longitudinal channels between the surface of each of said conductors and said sheath, said falciform channels being filled with oil.

2. An oil-filled multiple-core cable with separately insulated conductors of circular cross section, each of said separate insulated conductors being enclosed by a lead sheath, said sheath being of an elliptical cross-section, falciform longitudinal channels between the surface of each of said conductors and said sheath, said falciform channels being filled with oil, an outer armouring for the cable, a pressure resisting material, said pressure resisting material being arranged in the spaces of essentially triangular cross-section formed between said sheaths and said armouring.

3. An oil-filled multiple-core cable with separately insulated conductors of circular cross section, each of said separate insulated conductors being enclosed by a lead sheath, said sheath being of an elliptical cross-section, falciform longitudinal channels between the surface of each of said conductors and said sheath, said falciform channels being filled with oil, an outer armouring for the cable, metallic tubes of essentially triangular cross-section, said tubes being arranged in the spaces of essentially triangular cross-section formed between said sheaths and said armouring, signalling lines arranged within said tubes.

4. An oil-filled multiple-core cable with separately insulated conductors of circular cross section, each of said separate insulated conductors being enclosed by a lead sheath, said sheath being of an elliptical cross-section, falciform longitudinal channels between the surface of each of said conductors and said sheath, said falciform channels being filled with oil, said separate insulating conductors being twisted together, a metal band firmly surrounding said twisted separate conductors, said band being arranged in screw threads of low pitch, an outer armouring surrounding said band.

CARL CREMER.
MAX WEISET.